(12) United States Patent
Evers et al.

(10) Patent No.: US 6,540,054 B1
(45) Date of Patent: Apr. 1, 2003

(54) METHOD FOR INCREASING VIABLE WEAR LIFE OF CLUTCH BRAKE FRICTION MATERIALS

(75) Inventors: Kevin J. Evers, Fort Recovery, OH (US); Michael L. Short, Wapakoneta, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/691,369

(22) Filed: Oct. 18, 2000

(51) Int. Cl.[7] ............................................... F16D 25/10
(52) U.S. Cl. ..................... 192/12 C; 192/15; 192/109 F
(58) Field of Search .................. 192/12 C, 14, 192/15, 16, 18 R, 18 A, 109 F

(56) References Cited

U.S. PATENT DOCUMENTS

| 4,086,994 | A | * | 5/1978 | Hirosawa et al. ......... 192/109 F |
| 4,289,221 | A | * | 9/1981 | Chambers et al. .......... 192/3.57 |
| 4,629,045 | A | * | 12/1986 | Kasai et al ................... 192/52 |
| 4,674,613 | A | * | 6/1987 | Sikorski ....................... 192/52 |
| 5,868,020 | A | * | 2/1999 | Delaney et al. ............. 72/21.3 |
| 6,285,942 | B1 | * | 9/2001 | Steinmetz et al. ............ 701/67 |

* cited by examiner

Primary Examiner—Saul Rodriguez
(74) Attorney, Agent, or Firm—Randall J. Knuth

(57) ABSTRACT

A system and method for increasing the viable wear life of friction materials used on mechanical stamping hydraulic clutch/brake units by controlling the hydraulic clutch pressure to compensate for clutch wear.

7 Claims, 1 Drawing Sheet

METHOD FOR INCREASING VIABLE WEAR LIFE OF CLUTCH BRAKE FRICTION MATERIALS

BACKGROUND OF THE INVENTION

1. Field of the Invention

The present invention relates to a system and method for increasing the viable wear life of friction materials used on mechanical stamping hydraulic clutch/brake units by controlling the hydraulic clutch pressure to compensate for clutch wear.

2. Description of the Related Art

Existing systems use steady state hydraulic pressure to actuate the clutch. Accumulator units are used to augment the flow capabilities of the pump during heavy usage periods. No control system is in place to selectively and dynamically change the clutch pressure. As friction material wear occurs, mechanical adjustments for wear are required or the friction material elements must be replaced.

Mechanical presses, such as straight side presses and gap frame presses for stamping and drawing, generally include a frame having a crown and bed and a slide supported within the frame for reciprocating motion toward and away from the bed. The slide is typically driven by a crankshaft having a connecting arm connected to the slide, to which is mounted the upper die. Rotation of the crankshaft moves the connecting rods to effect straight reciprocating motion of the slide. The lower die is conventionally mounted to a bolster which, in turn, is connected to the bed.

Such mechanical presses are widely used for blanking and drawing operations and vary substantially in size and available tonnage depending on their intended use.

The primary apparatus for storing mechanical energy in a press is the flywheel. The flywheel and flywheel bearing are normally axially mounted on either the driveshaft, crankshaft, or the press frame by use of a quill. The flywheel is typically mounted at one end of the crankshaft and connected by a belt to the output pulley of a motor such that when the motor is energized, the massive flywheel rotates continuously. The motor replenishes the energy that is lost or transferred from the flywheel during press operations. When the clutch engages the flywheel to transmit rotary motion of the flywheel to the crankshaft, the flywheel drops in speed as the press driven parts are brought up to press running speed.

Continuous and repetitive clutch engagement and release causes the clutch friction material to wear. The clutch friction material abrades away and after a certain amount of wear, the clearance between the clutch and the flywheel grows. As the clearance grows, the time it takes for the clutch and flywheel to engage increases, thus reducing press cycle time.

SUMMARY OF THE INVENTION

According to the present invention, a method and apparatus are described for increasing the viable wear life of friction materials used on mechanical stamping hydraulic clutch/brake units by controlling the hydraulic clutch pressure to compensate for clutch wear.

Disclosed is a system designed to use a hydraulic clutch modulation system that allows control of the clutch engagement characteristics to improve the clutch reaction time and to allow for full utilization of more thickness of the clutch friction material without having to replace the friction pads or adjust the clutch mechanism.

Through the use of a hydraulic valve, servo valve and/or other control system, the clutch hydraulic pressure can be selectively and dynamically increased during clutch actuation and returned to a normal clutch pressure setting prior to beginning the stamping operation. Increasing the pressure during clutch actuation means that the clutch will fill faster with oil and also translate faster axially to engage with the flywheel. Improvements in clutch responsiveness can result in up to two or three times the serviceable life of the friction wear pads before removal of the pads is required.

Axial clearances in the clutch unit increase as the friction material wears. Increasing axial clearances results in slower response times when engaging the hydraulic clutch since additional time is required to translate the hydraulic clutch components through the clearances. By controlling the pressure and flow characteristics of the oil into the clutch, the clutch actuation responsiveness can be maintained at original specifications as the friction material wears and clearances increase.

The system as used on a mechanical stamping hydraulic press includes a hydraulically actuated clutch with an oil supply system, and a control package to operate the hydraulic system. On clutch engagement, the control package will cause the hydraulic supply unit to supply oil under elevated pressure to the clutch, resulting in rapid clutch engagement. Once engagement is completed the control system will cause the hydraulic supply unit to return to a normal operating pressure, sufficient to maintain the clutch at the required operating torque levels.

The invention, in one form thereof, includes a dual pressure pump system having the ability to operate the pump at either a high pressure or low pressure and means for applying working pressure from said dual pressure pump system such that a higher pressure is applied during clutch engagement.

An advantage of the present invention is the clutch engagement time is reduced allowing for greater operator productivity and safety.

Another advantage of the present invention is that improvements in clutch responsiveness can result in up to two to three times the serviceable life of the friction wear pads before service is required.

Another advantage of the present invention is that since the clutch is operating at normal pressures and the high pressure spike is used only during clutch engagement, no clutch design torques are exceeded.

A further advantage of the invention is that existing presses may be quickly retrofitted with this design.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
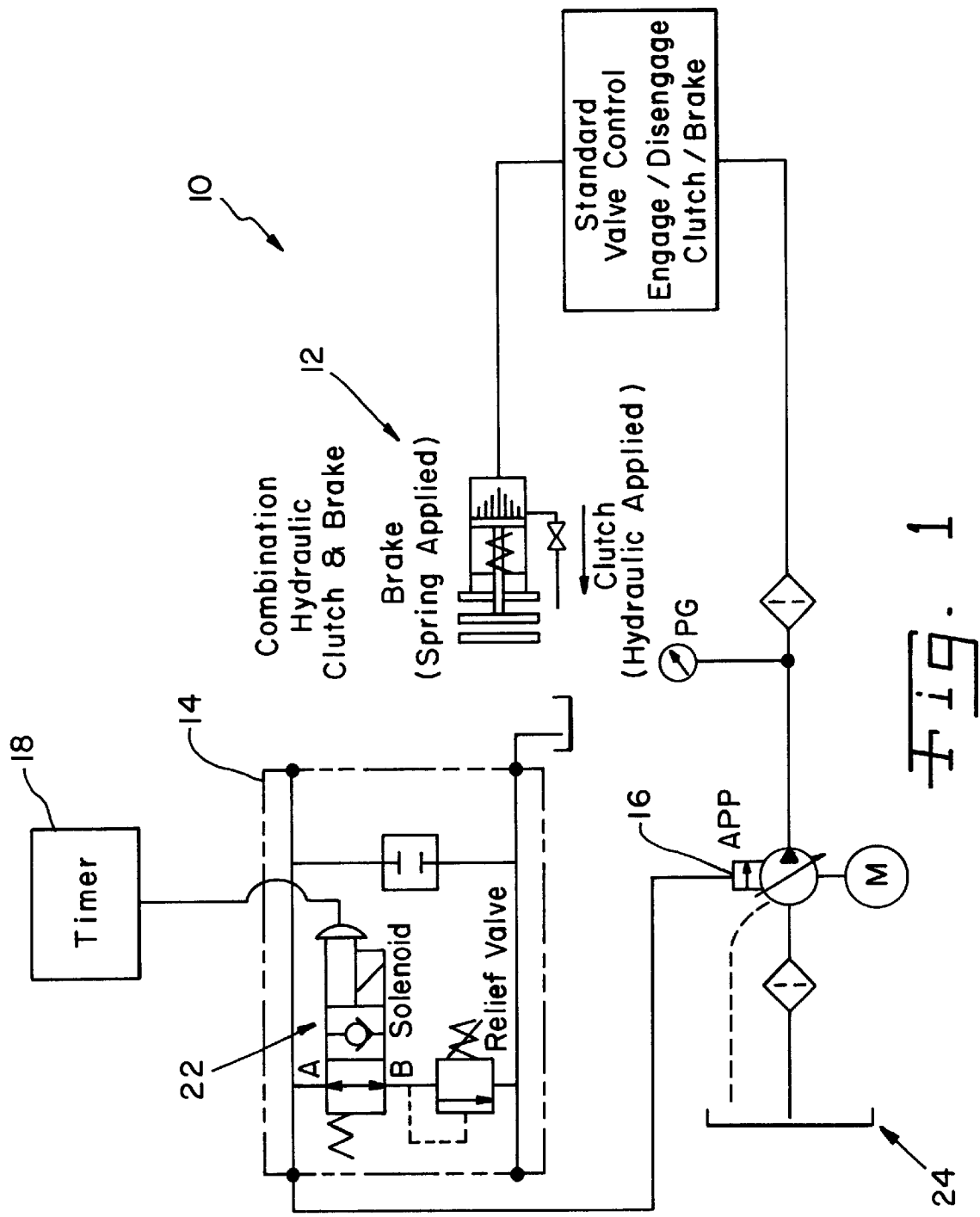
FIG. 1 is a schematic circuit diagram of the invention illustrating the operation of the dual pressure system.

The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawing and particularly to FIG. 1, there is shown a dual pressure hydraulic operating system 10 for a mechanical stamping hydraulic press. A hydraulically actuated clutch/brake combination 12 with an oil supply receiver 24, and a control package 14, 16 to operate the hydraulic operating system 10. On clutch engagement, the control package 14,16 will cause the hydraulic supply unit to supply oil under elevated pressure to the clutch, resulting in rapid clutch engagement. The remote compensator control module 14 includes a solenoid 22. A timer 18 is in series with the solenoid 22 controlling the length of time that the high pressure is active in the clutch/brake combination 12. The remote compensator control module 14 also sets the normal pressure value while the high operating pressure is controlled by the remote compensator 16. The standard valve control 20 engages and disengages the clutch brake. Once engagement is completed the control system will cause the hydraulic supply unit to return to normal operating pressure sufficient to maintain the clutch at the required operating torque levels. The high pressure applied is in the range of 500 to 2000 psi. Of course, this would change depending on the size of the clutch-brake unit and the volume of oil or fluid needed to be moved quickly. Such timed high pressure application decreases clutch engagement response time by between 50 milliseconds to 500 milliseconds. The decrease needed in any particular clutch/brake unit needs to be determined through trial and error, accounting for the clutch facing wear experienced in any particular clutch/brake unit.

The method for increasing the viable wear life of friction materials used on a mechanical stamping hydraulic clutch/brake unit is described below.

A dual pressure pump system is provided having the ability to operate the pump at either a high pressure or low pressure. The dual pressure pump system applies working pressure from the dual pressure pump system such that a higher pressure is applied during clutch engagement and a lower pressure or a standard operating pressure is returned to the clutch during clutch operation.

Thus, the present invention provides a hydraulic clutch modulation system and method which controls the clutch engagement characteristics to improve the clutch reaction time to allow utilization of more thickness of the clutch friction material without having to replace the friction pads or adjust the clutch mechanism.

The timer 18 of the system may be preferably set in a range of 10 to 500 milliseconds. Such actual timer setting will be developed for each unique clutch/brake system. Such timer could be manually or automatically set. Automatic setting of timer could be accomplished by measuring and calculating a timer setting based on a clutch surface wear measurement. Such calculation could be a lookup table based on past empirical measurements and determined timer settings.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for increasing the viable wear life of friction materials used on a hydraulic clutch/brake unit of a mechanical stamping press, the method comprising the steps of:

providing a dual pressure pump system, said dual pressure pump system configured to selectively operate the pump at one of a clutch engagement pressure and a normal operating pressure, said clutch engagement pressure being greater than said normal operating pressure;

applying said clutch engagement pressure from said dual pressure pump system during clutch engagement; and applying said normal operating pressure from said dual pressure pump system to maintain the clutch/brake unit at a sufficient operating level for the mechanical stamping press.

2. The method according to claim 1 wherein said dual pressure pump system includes a remote control compensator circuit on a timer; and including the step of setting the timer to allow for high pressure operation during the clutch engagement and the return to low pressure operation once the clutch has engaged.

3. A system for increasing the viable wear life of friction materials, the system comprising:

a hydraulic clutch/brake unit of a mechanical stamping press;

a dual pressure pump system, said dual pressure pump system configured to selectively operate the pump at one of a clutch engagement pressure and a normal operating pressure, said clutch engagement pressure being greater than said normal operating pressure;

means for applying said clutch engagement pressure from said dual pressure pump system during clutch engagement.

4. The system according to claim 3 wherein said means for applying said clutch engagement pressure includes a remote pressure compensator control module in series with a timer.

5. The system according to claim 3 wherein said clutch engagement pressure is set in a range from 500 to 2000 psi.

6. The system according to claim 4 wherein said high pressure clutch engagement response time is decreased by 50 milliseconds to 500 milliseconds.

7. The system according to claim 4 wherein said timer is set in a range from 10 to 500 milliseconds.

* * * * *